Figure 1:
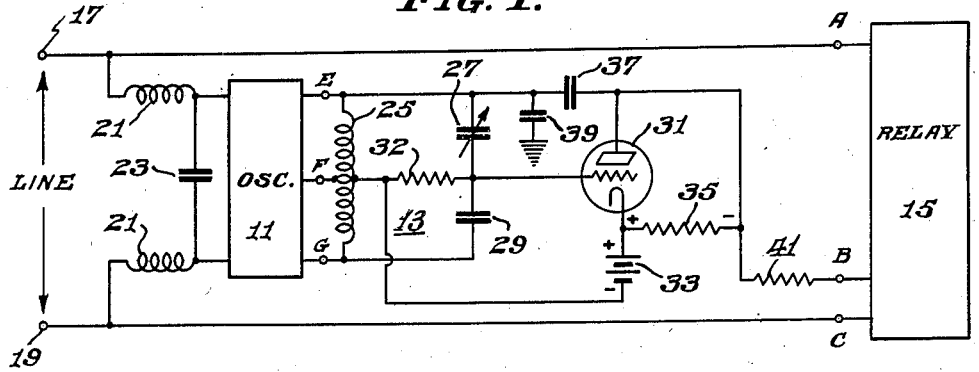

July 21, 1942.   F. H. SHEPARD, JR   2,290,771
RELAY SYSTEM
Filed April 25, 1939   2 Sheets-Sheet 1

Inventor
Francis H. Shepard, Jr.
By
Attorney

July 21, 1942.  F. H. SHEPARD, JR  2,290,771
RELAY SYSTEM
Filed April 25, 1939  2 Sheets-Sheet 2

Inventor
Francis H. Shepard, Jr.
By
Attorney

Patented July 21, 1942

2,290,771

UNITED STATES PATENT OFFICE 2,290,771

RELAY SYSTEM

Francis H. Shepard, Jr., Merchantville, N. J., assignor to Radio Corporation of America, a corporation of Delaware Application April 25, 1939, Serial No. 269,921

5 Claims. (Cl. 250—27)

This invention relates to relay systems, and more particularly to an automatic relay for controlling the operation of a device in response to a change in a predetermined condition.

Devices of this general nature have been employed to detect the presence of an intruder in a room and to give an alarm by ringing a bell, or the like, or to detect the presence of metallic bodies which are brought within a particular region. The uses to which such devices may be put are unlimited. They may be made to respond to changes in capacity, inductance, resistance, temperature, or almost any other physical quantity.

Several of the devices of the prior art operate on the beat note principle; that is, a beat note of any desired frequency including zero is produced by a pair of oscillators, one of which is fixed while the frequency of the other is adapted to be varied by the object whose presence is to be indicated. Any change from a given initial condition indicates that the frequency of one of the oscillators has been changed. One disadvantage of such a system is that changes in the ambient temperature and humidity upset the initial balance. To correct such difficulties, it is necessary to resort to complicated compensating systems.

I have described another system in my Patent No. 2,100,756, which issued November 30, 1937, which is based on the idea of controlling the amplitude of oscillation of a vacuum tube oscillator by causing the unbalance to vary the amount of feedback. Due to the amplification attained by the regenerative action, such a system is extremely sensitive to small changes, and is therefore difficult to maintain it in balance in the presence of comparatively large changes which are produced by temperature and humidity. For example, where an antenna is used as a part of the balanced system, I have found that the capacity and power factor of the antenna itself, in some instances, may change as much as 30% from day to day.

To provide satisfactory performance, a device of this nature must be unresponsive to slow changes which are produced by weather conditions, but must still be sensitive to small changes which take place in a relatively short time. The system should stay in adjustment over long periods of time. It is, therefore, among the objects of this invention to fulfill the above requirements.

The operation of the indicator or alarm must also be considered. If the device is to be used to sound an alarm if an intruder enters a protected area, it is desirable to have a system in which the alarm, upon being operated by the intruder, continues to operate until it is manually shut off and the system restored to balance. The present invention may be adapted to such a use; however, it is directed particularly to that type of automatic relay in which the presence of a person causes a window display to be illuminated or a device to be set in operation for a predetermined period or until the person leaves, the system then being restored to normal and automatically resetting itself for the next cycle of operation.

In the case of the general illumination of a display window, the device should operate so long as the person remains within a given area. If, however, a particular apparatus is to be set in motion to perform an operation which takes a certain time to complete, it would be desirable to have a relay which turned the device on only for the period necessary to complete the operation. The system should then reset itself to repeat the operation upon the approach of a second person, even though the first person does not move away. A device of this nature should also permit changes in the arrangement of the display window to be made without interfering with the sensitivity of the device to the comings and goings of the passersby, and without making necessary a readjustment of the balanced network.

Finally, another desirable mode of operation would be that in which the relay would cause the display window to be illuminated or would start the operation of some device which would continue until the person who instituted it moved away, and yet have the feature discussed above that changes in the display window arrangement would not upset the operating cycle. It is, therefore, among the further objects of the invention to provide a relay mechanism which has the desirable features which have been pointed out above.

This invention will be better understood from the following description when considered in connection with the accompanying drawings, and its scope is indicated by the appended claims. Similar reference numerals refer to similar parts throughout the several drawings.

Figure 2:
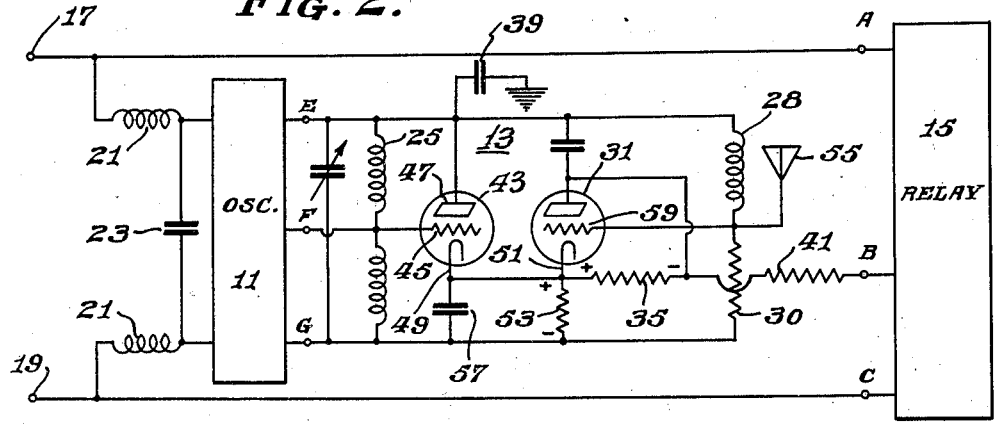
Figure 3:
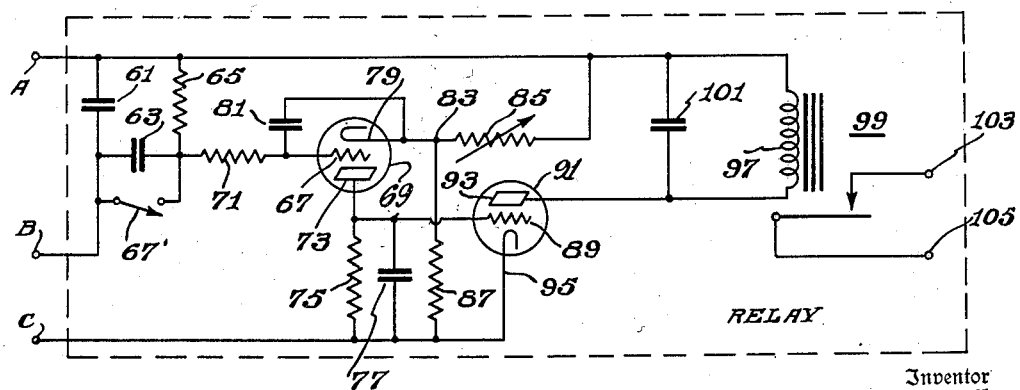
Figure 4:
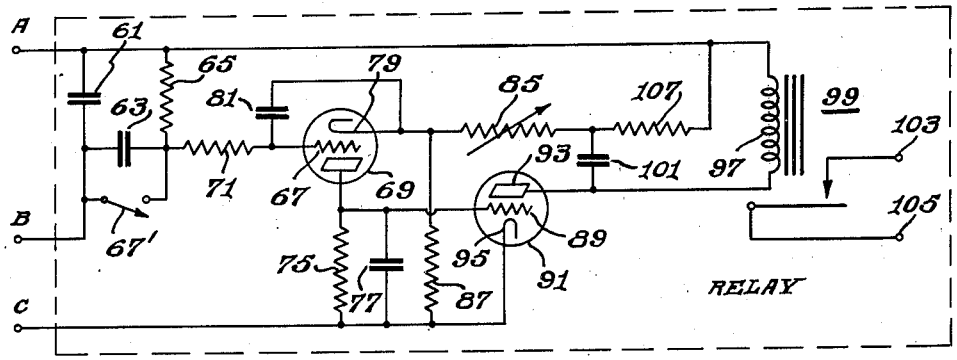
Figure 5:
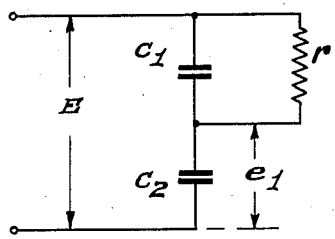
Figure 6:
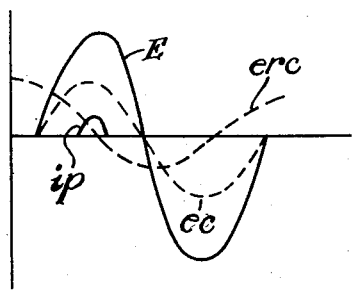
Figure 7:
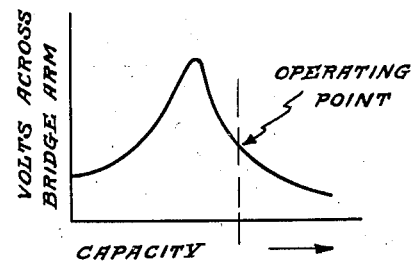

Referring to the drawings, Figures 1 and 2 are embodiments of my invention, and are shown partly in block diagram and partly in schematic form; Figures 3 and 4 are embodiments of the relay portion of the devices illustrated in the preceding figures of the drawings; and Figures 5, 6 and 7 are diagrams to assist in the explanation of the operation of this invention.

Referring to Fig. 1, the general arrangement of a relay is illustrated in simplified form. The device consists of a source of alternating current of any desired frequency such as an oscillator 11, a balanced bridge 13, and a relay or translating means 15. Both the oscillator and the relay are shown in block diagram form in order to simplify the explanation. The details of the oscillator are not given since any well known oscillator may be used, but several types of relays will be discussed subsequently.

The oscillator 11 is energized from any suitable source of alternating or direct current. In the example shown it is connected to a pair of terminals 17 and 19 to which a commercial power line is to be connected. The oscillator circuit is preferably isolated from the power lines by means of a pair of chokes 21 and a bypass condenser 23. The output voltage of the oscillator appears between a pair of terminals E and G, across which is connected a center tapped impedance 25. This impedance may be the oscillator tank inductor, or it may be any impedance connected across the alternating current source. The frequency of the oscillator is adjusted to any desired value in any conventional manner.

A serially-connected variable impedance 27 and fixed impedance 29 are connected across the terminals of impedance 25. The midpoint of the last-named impedances is connected to the grid of a thermionic tube 31 and through a grid return resistor 32 to the center tap of impedance 25. The cathode of tube 31 is connected through a biasing battery 33 to the midpoint of impedance 25, and also through a resistor 35 to its anode electrode. The anode is also coupled to output terminal E by means of a capacitor 37. Output terminal E is bypassed to ground by a capacitor 39.

Terminals A and B constitute the output of the bridge circuit and are connected to the input of the relay 15. Terminal B is connected to the anode of tube 31 through a resistor 41, while terminal A is connected to the line voltage terminal 17. Power for the relay system is derived from the same line terminals through a connection between line terminal 19 and the relay system by means of terminal C.

The operation of the bridge section of the device will now be explained. It is apparent that the impedances 25, 27 and 29 are connected to form a bridge circuit in which the oscillator voltage is applied across one pair of diagonal terminals E and G, while the cathode and grid of tube 31 are connected between the opposite diagonals of the bridge. While I have illustrated the bridge arrangement by means of inductors and capacitors, it is to be clearly understood that any suitable bridge arrangement may be used. Capacitor 27 has been shown variable, and represents the variable arm of the bridge whose impedance is to be effected by the person or object which is to be detected.

When the bridge is suitably balanced, the instantaneous alternating potential difference between the grid and the cathode of the tube 31 will be zero. During a half of each cycle, both the grid and cathode will become negative with respect to the anode, so that a current will flow through the anode load resistor 35, the amplitude of which depends upon the bias which is supplied by battery 33. The voltage drop in resistor 35 due to the anode current will, therefore, have a certain value when the bridge is balanced. By a suitable choice of resistance for the anode load, the direct current output voltage, which is equal to the difference between the voltage drop across resistor 35 and the bias battery voltage, may be made to have any desired amplitude and polarity, when the bridge is balanced. In the present instance when the bridge is balanced the output voltage is made zero. When the bridge is unbalanced, the anode voltage will vary accordingly, and the varying direct voltage which appears between terminals A and B may be utilized in any desired manner to operate a relay or indicating device.

A unique bridge circuit is illustrated in Fig. 2. The bias battery 33 has been replaced by a circuit which includes a triode vacuum tube 43 which is used to provide a fixed bias voltage. The center tap of inductor 25 is connected to the grid 45 of the triode 43. The corresponding anode 47 is connected to terminal E of the oscillator. The two cathodes 49 and 51 are connected together and to terminal G of the oscillator through a biasing resistor 53. It should be understood that points E and G represent the bridge input terminals and the grids 45 and 59 of the tubes 43 and 31 are the bridge output terminals. The final output of the system is applied from the anode circuits of the tubes 43 and 31 to the terminals A and B. The remaining connections are the same as those shown in Fig. 1, and need not be described again in detail.

An alternative method of unbalancing the bridge is also illustrated in Fig. 2. Capacitors 27 and 29 have been replaced by an inductor 28 and a resistor 30. To the high potential end of inductor 28 an antenna 55 is connected. This antenna has a certain resistance and capacity to ground and forms with inductor 28 a shunt resonant circuit, the impedance of which is substantially resistive. The frequency of the oscillator 11 is adjusted so that the bridge is balanced when the oscillator frequency is on the slope of the resonance curve of the shunt circuit as shown in Fig. 7. Consequently, when the antenna capacity is affected by the presence of an object, such as a person, the impedance of that arm of the bridge which includes inductor 28 and antenna 55 is changed. This unbalances the bridge and produces a voltage between the opposite ends of the bridge circuit to which the grids of tubes 43 and 31 are connected. If desired, however, the antenna capacity alone may constitute one bridge arm, in which case the balance will be independent of variations in the frequency of the oscillator.

During the half cycle of each alternation in which anode 47 is positive with respect to cathode 49, a bias voltage is developed across resistor 53 which tends to charge capacitor 57. A fixed voltage drop is, therefore, maintained across resistor 53 which is the equivalent of the battery 33 illustrated in Fig. 1. Consequently, a change in the antenna capacity which produces, as explained above, a change in the voltage on the grid 59 changes the anode current through resistor 35 to produce a change in direct current potential between terminals A and B.

Assuming that, in the normal or balanced condition, the frequency of oscillator 11 is slightly higher than the resonant frequency of inductor 28 and antenna 55, if the capacity of the antenna to ground is given a positive increment, that is, if it is increased by the presence of some object in the immediate vicinity, the resonant frequency of the circuit will move away from the oscillator frequency, the voltage drop across it will decrease, and the voltage on grid 59 will tend to increase, thus increasing the anode current. The output voltage will, therefore, become more negative.

The amplitude of the biasing potential which is produced either by battery 33 of Fig. 1 or resistor 53 of Fig. 2, or their equivalent, is preferably sufficiently great so that tube 31 is operative only during the peak of the applied alternating potential. By this means, the bridge balance is made substantially independent of the resistance components of the arms. The power factor of the antenna, for example, is particularly apt to undergo large changes when the weather changes from day to day. Such changes upset the balance of the ordinary bridge, and make constant readjustments necessary. The sensitivity of the present arrangement not only is unaffected by reasonable changes in the power factor, but it does not require specific means for balancing out resistance components originally.

To illustrate this principle of operation, reference is now made to Figs. 5 and 6. Fig. 5 represents one arm of a bridge containing, for example, capacitors $C_1$ and $C_2$, the former representing, say, an antenna, and the latter, a balancing capacitor. At a given frequency the antenna will have a shunt resistance component $r$, which is subject to change. A voltage $E$ is applied and it is desired to investigate the effect of $r$ upon the output voltage $e_1$ which appears across $C_2$.

Referring now to Fig. 6, a sine wave voltage $E$ is applied across the bridge arm. Two currents flow through $C_2$: one a capacitive current which passes through $C_1$ and produces a voltage represented by $e_c$, and the other a resistive current from $r$, which produces a voltage $e_{rc}$ in quadrature with $e_c$. Consequently, the voltage $e_1$ across capacitor $C_2$ is equal to the vector sum of $e_c$ and $e_{rc}$. It will be seen that $e_{rc}$ is always zero at the instant when $E$ and $e_c$ are a maximum. If a reading of the bridge balance is taken only at the instant $e_{rc}$ is zero, obviously the bridge balance will be practically independent of $r$ as desired. This is accomplished by biasing the indicator tube 31 so that current flows only during the peak of the applied voltage $E$, as shown by the curve $i_p$. By this method, one of the most serious disadvantages of a balanced capacity bridge relay has been removed, since it is now relatively free from variations due to changes in the power factor of one of the arms. This system is applicable to bridges of this type wherever used.

Having thus explained a device by which the presence of a person or an object within a predetermined area produces a direct voltage of varying amplitude, the remaining portion of the system will now be described by which such a voltage may be made to control the operation of an indicator or other device. An arrangement in which the approach of a person sets a device in operation for a limited time, and then automatically resets itself in preparation for the next cycle of operation, is illustrated in Fig. 3. Terminals A, B and C are the terminals bearing the same reference letters which are illustrated in the preceding figures. It is apparent, therefore, that the alternating current line voltage appears directly across terminals A and C, while the control voltage is developed between terminals A and B. It is to be noted that the system illustrated in Fig. 3 operates directly from the alternating current line without rectifiers or other devices for supplying the usual direct current operating potentials.

A capacitor 61 is connected between terminals A and B. Terminal B is also connected through a capacitor 63 and a resistor 65 to terminal A. A switch 67 is provided which may be utilized to short-circuit capacitor 63 in order to make preliminary adjustments on the device, or to make the device sensitive to static values of antennae to ground capacity, as will be subsequently described. The junction point of capacitor 63 and resistor 65 is connected to the grid 67 of a thermionic tube 69 through a resistor 71. The anode 73 of tube 69 is connected through an anode load resistor 75 to the line terminal C. This resistor is bypassed by a capacitor 77. The cathode 79 is coupled to grid 67 by a capacitor 81, and is also connected to a tap 83 on a voltage divider which comprises two resistors 85 and 87, which are serially connected between the alternating current line terminals A and C.

The anode 73 is connected to the grid 89 of a second thermionic tube 91, the cathode 95 of which is connected to terminal C. The anode 93 of the last-named tube is connected to terminal A through the energizing coil 97 of a relay 99. The coil may be bypassed by a capacitor 101. The relay is used to operate any desired device, light, or indicator as described above, the power control to which is connected through the relay terminals 103 and 105.

The relay 99 is initially adjusted with switch 67 closed, short-circuiting capacitor 63. When the bridge circuit is in balance, no D. C. potential appears between terminals A and B. Resistor 85 is adjusted so that the positive cathode bias which is applied to tube 69 during the half cycle in which terminal A is negative with respect to terminal C permits anode current to be drawn through resistor 75, which is of such a value that the relay mechanism just remains open. It is apparent that since there is an alternating voltage between terminals A and C, during half of the alternating cycle a negative voltage with respect to the cathode 79 is applied to anode 73. During this interval, therefore, tube 69 is nonconducting. During the other half cycle, however, in which terminal C is positive with respect to terminal A, a current flows from anode 73 to cathode 79 whose amplitude depends upon the positive cathode bias produced by resistor 85.

Due to the flow of current through resistor 75 during a portion of alternate half cycles of the applied line voltage, the average D. C. potential of the anode 73 becomes negative with respect to the D. C. potential of either line A or line C, since the D. C. potential between the two lines is zero. This negative potential charges capacitor 77 so that the potential of the anode is maintained at a relatively constant value throughout both alternating cycles.

In the subsequent half cycles, when tube 69 is non-conducting, line terminal A becomes positive with respect to line terminal C, applying an instantaneous positive potential to the plate 93 of tube 91. Consequently, the anode current of tube 91 depends on the average D. C. potential of grid 89 which is connected to the anode of tube 69. The tubes 69 and 91 thus constitute an A. C. operated D. C. amplifier to amplify the control impulses which are derived from the unbalancing of the bridge, the impulses being sufficient to operate relay 99.

If it is desired, the device may be operated with switch 67 closed, in which case it is merely a capacity-operated relay, which will operate the controlled device as long as the bridge is unbalanced. However, the system does not automatically compensate for slow changes as it will when switch 67 is opened.

When the switch 67 is opened it is seen that any direct current potentials existing between terminals A and B are no longer applied to the grid 67. Sudden changes in the voltage between terminals A and B, however, are impressed on the grid by means of capacitor 63. If a person approaches the antenna 55 the change is such that the D. C. potential of terminal B becomes negative with respect to that of terminal A, and condensers 61 and 63 will be charged and the grid 67 will become more negative, thus decreasing the anode current through tube 69. The charge on the condensers will leak off through resistor 65, and, depending upon the time constant, grid 67 will ultimately return to its normal value. By properly selecting the time constant of the input circuit which includes capacitor 63 and resistor 65, the voltage upon grid 67 may be maintained at a negative value for any desired period, at the end of which time the voltage will have returned to its normal value.

In the presence of such a negative impulse, the anode current through resistor 75 will decrease, and the negative D. C. potential of anode 73 and grid 89 with respect to the line terminals will decrease. This increases the current which flows through tube 91 in the successive half cycle of the line voltage and operates the relay. The relay will remain closed until such time as the potential of grid 67 has dropped to its normal value, at which time the system is then ready to repeat the cycle when a second person approaches, and this is accomplished whether or not the first person remains near the antenna. When a person leaves the vicinity of the antenna, a positive impulse is impressed on grid 67. If the grid has already returned to its normal potential, the additional bias will have no effect since the relay has already opened. If, however, there is still a voltage on grid 67 from the preceding impulse of opposite polarity, the second impulse will tend to discharge the capacitor and return the system to its normal condition. It is to be noted, in this connection, that when an impulse arrives of a polarity which tends to make the grid 67 positive with respect to its cathode, the cathode-grid electron path is in shunt with resistor 65, and the time constant of the input network is greatly reduced. Thus, when a person leaves the vicinity of antenna 55, the positive impulse which is imparted to grid 67 does not remain for more than a very short interval, thus permitting the system to be operated immediately thereafter upon the approach of another person.

A further modification of my invention is illustrated in Fig. 4, which is nearly identical with Fig. 3, except for the inclusion of a resistor 107 in series with the voltage divider comprising resistors 85, 87, and including the connection from capacitor 101 to line terminal A.

The purpose of this resistor is to provide a "snap switch" action by means of which the relay is made to operate once when the bridge is unbalanced in one direction and to remain fixed an indefinite time until an impulse of the opposite polarity is received.

Assume the system ready for operation and that a negative D. C. impulse is impressed on the grid of tube 69 by the approach of a person within the antenna field. As explained above, this increases the potential of grid 89 and likewise increases the anode current of tube 91. As a result, a unipotential pulsating current flows through resistor 107, capacitor 101 and tube 91, increasing the A. C. voltage drop across resistor 107 and thus increasing the instantaneous positive bias on cathode 79, which is, of course, the equivalent of increasing the instantaneous negative bias on grid 67. In addition, the negative D. C. potential of the grid is further increased by the flow of electrons from cathode to grid during the alternate half cycle.

Thus, by making grid 67 negative by the control impulse, a voltage is applied to the tube which aids the original change. The negative grid bias rises to such a value that the tube is completely cut off and no anode current flows. This condition is maintained, and thus relay 99 remains closed, until such time as a positive impulse is applied to the grid. A positive impulse causes the system to reverse itself. Thus, when the grid is made positive, current flows through resistor 75, and tube 91 is biased off by the voltage drop across resistor 75, the relay opens, and the system remains in this condition until the next negative impulse starts the next operating cycle.

The system described is also almost completely independent of variations in the A. C. line voltage. I have been able to vary the line voltage over a range which is far greater than that which is likely to be encountered in actual practice without setting off the indicator or affecting its sensitivity.

I have thus described an automatic relay system which includes a number of unique features, including its ability to compensate itself for slow changes due to weather conditions and also to compensate for substantial variations due to the rearrangement of fixed objects in the vicinity of the device.

I claim as my invention:

1. In a device of the character described, a source of alternating potential, a bridge circuit including a reactance, means for applying said potential to said bridge circuit, and means connected to said bridge circuit responsive to a change in said reactance, said means including a biased rectifier responsive only to the amplitude of the bridge output potential during intervals at which the resistive component of the output voltage is approximately zero whereby the indication of said change is independent of variations in the power factor of the elements of said bridge.

2. A direct current controlled relay system comprising a first thermionic tube having cathode, grid and anode electrodes, means for applying a direct current control impulse between said grid and cathode electrodes, a second thermionic tube coupled to the output of said first tube, means in a common circuit with said tubes adapted to produce a voltage in said first tube whereby the application to said first tube of a control impulse of a given polarity initiates a current flow through said second tube and said common means which biases said first tube beyond anode current cutoff, and the application to said first tube of a control impulse of the opposite polarity initiates a current through said first tube which in turn biases said second tube beyond anode-current cutoff, and translating means responsive to the anode current of said second tube.

3. A direct current controlled relay system comprising a first thermionic tube having cathode, grid and anode electrodes; means for applying a direct current control voltage to said grid electrode; a source of alternating current for energizing said system; impedance means connecting said anode to one terminal of source; a voltage divider connected across said source, said cathode being connected to a tap intermediate the ends of said voltage divider, a second thermionic tube having cathode, grid and anode electrodes, the grid electrode of said second tube being connected to the plate electrode of said first tube, the cathode electrode of said second tube being connected to said one terminal of said source; and a capacitor coupling the anode electrode of said second tube to said voltage divider at a point intermediate said tap and the other terminal of said source.

4. A relay system comprising a first thermionic tube having cathode, grid and anode electrodes, means for applying a derived control impulse to said grid electrode, a second thermionic tube coupled to the output of said first tube, means in a common circuit with said tubes adapted to produce a voltage in said first tube whereby the application to said first tube of a control impulse of a given polarity initiates a current flow through said second tube and said common means which biases said first tube beyond anode current cutoff, and the application to said first tube of a control impulse of the opposite polarity initiates a current through said first tube which in turn biases said second tube beyond anode-current cutoff, and translating means responsive to the anode current of said second tube.

5. In a relay device, the combination including a source of constant frequency alternating potential, a balanced bridge having conjugate input and output terminals, means for unbalancing a reactance arm of said bridge in response to a condition to be indicated, means for applying said alternating voltage to said input terminals, a thermionic tube having input and output circuits, means coupling said input circuit to the output terminals of said bridge, and means biasing said tube to plate current cut-off so that plate current flows only during the application of the voltage peaks of said alternating potential and during said bridge unbalancing whereby the rebalancing of said bridge is made independent of quadrature currents due to unbalanced resistance elements in said bridge.

FRANCIS H. SHEPARD, Jr.